US009768671B2

(12) United States Patent
Hattori et al.

(10) Patent No.: US 9,768,671 B2
(45) Date of Patent: Sep. 19, 2017

(54) INVERTER-INTEGRATED ELECTRIC COMPRESSOR (71) Applicant: MITSUBISHI HEAVY INDUSTRIES AUTOMOTIVE THERMAL SYSTEMS CO., LTD., Kiyosu-shi, Aichi (JP)

(72) Inventors: Makoto Hattori, Tokyo (JP); Masahiko Asai, Tokyo (JP)

(73) Assignee: MITSUBISHI HEAVY INDUSTRIES AUTOMOTIVE THERMAL SYSTEMS CO., LTD., Aichi (JP)

( * ) Notice: Subject to any disclaimer, the term of this patent is extended or adjusted under 35 U.S.C. 154(b) by 209 days.

(21) Appl. No.: 14/436,823

(22) PCT Filed: Oct. 2, 2013

(86) PCT No.: PCT/JP2013/076868
§ 371 (c)(1),
(2) Date: Apr. 17, 2015

(87) PCT Pub. No.: WO2014/087729
PCT Pub. Date: Jun. 12, 2014

(65) Prior Publication Data
US 2015/0288258 A1    Oct. 8, 2015

(30) Foreign Application Priority Data

Dec. 7, 2012 (JP) ................ 2012-268306

(51) Int. Cl.
*H02K 11/00* (2016.01)
*F04B 35/04* (2006.01)
(Continued)

(52) U.S. Cl.
CPC .......... *H02K 11/0073* (2013.01); *F04B 35/04* (2013.01); *F04B 39/121* (2013.01);
(Continued)

(58) Field of Classification Search
CPC ......... H02K 5/22; H02K 9/22; H02K 11/0094
(Continued)

(56) References Cited

U.S. PATENT DOCUMENTS 8,882,479 B2 * 11/2014 Asai .................. F04B 35/04
310/68 R
2003/0200761 A1    10/2003 Funahashi et al.
(Continued)

FOREIGN PATENT DOCUMENTS

CN    2003-324903 A    1/2009
CN    101356868 A    1/2009
(Continued)

OTHER PUBLICATIONS

Decision of Patent Grant issued on Oct. 4, 2016 in Japanese Patent Application No. 2012-268306 with an English Translation.
(Continued)

*Primary Examiner* — Hanh Nguyen
(74) *Attorney, Agent, or Firm* — Birch, Stewart, Kolasch & Birch, LLP (57) ABSTRACT The purpose of the present invention is to provide an inverter-integrated electric compressor that has improved inverter device assemblability with respect to a housing, allows for improved productivity and reduced manufacturing costs, and allows an inverter device, and thus the electric compressor itself, to be made more compact and lightweight. Provided is an inverter-integrated electric compressor (1), wherein an inverter device (7) is provided with a resin structure (12) formed as a single unit with a housing section for high-voltage system components and a circuit board assembly section, and by assembling a power system circuit board, a control system circuit board (15), a busbar, a plurality of high-voltage system components that make up the inverter device (7), and the like onto the resin structure
(Continued)

(12), the inverter device (7) is made into a unit (34) and this unit (34) is assembled onto and integrated with the inverter housing section (8).

11 Claims, 6 Drawing Sheets

(51) Int. Cl.
  *F04B 39/12* (2006.01)
  *H02K 5/22* (2006.01)
  *H02K 9/22* (2006.01)
  *H02K 11/33* (2016.01)
(52) U.S. Cl.
  CPC .............. *H02K 5/22* (2013.01); *H02K 9/22* (2013.01); *H02K 11/33* (2016.01); *F04C 2240/808* (2013.01); *H02K 5/225* (2013.01)
(58) Field of Classification Search
  USPC ..................................... 310/68 R, 68 D, 68 A
  See application file for complete search history.

(56) References Cited

U.S. PATENT DOCUMENTS

| | | |
|---|---|---|
| 2007/0231165 A1 | 10/2007 | Koide et al. |
| 2009/0161320 A1 | 6/2009 | Sugiyama et al. |
| 2009/0244854 A1* | 10/2009 | Hattori ................ H05K 7/1432 36/736 |
| 2009/0255704 A1* | 10/2009 | Niwa ...................... F04B 35/04 174/68.2 |
| 2010/0143167 A1 | 6/2010 | Itabashi et al. |
| 2011/0211981 A1 | 9/2011 | Saito et al. |
| 2013/0069494 A1 | 3/2013 | Hattori et al. |
| 2013/0119834 A1* | 5/2013 | Nakagami ............... F04B 39/21 310/68 D |

FOREIGN PATENT DOCUMENTS

| | | |
|---|---|---|
| CN | 101622449 A | 1/2010 |
| CN | 102203419 A | 9/2011 |
| JP | 2003-322082 A | 11/2003 |
| JP | 2004-254359 A | 9/2004 |
| JP | 2007-263061 A | 10/2007 |
| JP | 2009-235965 A | 10/2009 |
| JP | 2009-275606 A | 11/2009 |
| JP | 2010-209685 A | 9/2010 |
| JP | 2012-87630 A | 5/2012 |

OTHER PUBLICATIONS

Chinese Notice of Granting a Patent Right for Invention, issued Aug. 3, 2016, for Chinese Application No. 201380056734.5, along with an English translation.

* cited by examiner

INVERTER-INTEGRATED ELECTRIC COMPRESSOR

TECHNICAL FIELD

The present invention relates to an inverter-integrated electric compressor in which an inverter device is integrally incorporated into the housing of an electric compressor.

BACKGROUND ART

Inverter-integrated electrical compressors, which integrally incorporate inverter devices, are used as air conditioner compressors installed in electric vehicles, hybrid vehicles, and the like. This inverter-integrated electric compressor is configured so that high voltage direct current power supplied from a power supply unit installed in a vehicle is converted to three-phase alternating current power of a specified frequency, which is then applied to the electric motor so that the electric motor is driven.

An inverter device is constituted by, for example, high-voltage system components, such as inductor coils, smoothing capacitors, and the like provided on a high-voltage line from a power source, that reduce high-frequency noise, current ripples, and the like; a power system circuit board on which is mounted a switching circuit constituted by a plurality of switching elements (power elements), such as IGBT, that convert direct current power to three-phase alternating current power; a control system circuit board (printed circuit board) on which is mounted a control circuit that operates at a low voltage, such as a CPU; a busbar that interconnects these high-voltage system components, the power system circuit board, and the control system circuit board; and the like. The inverter device is configured so as to convert the direct current power that is input via a P-N terminal into three-phase alternating current power, which is then output from a UWV terminal.

A variety of assembly structures have been provided for the housing of this inverter device. Patent Document 1 discloses an inverter-integrated electric compressor in which a unit having a printed circuit board and a resin-insert-molded busbar assembly which also serves as an external frame integrated therein, the unit is fastened onto a seating face of a housing, on which a plurality of high-voltage components, such as switching elements, capacitors, and the like, are mounted, the terminals of the various electrical components are interconnected by the busbar, the interior of the external frame is filled with gel material and a cover plate is mounted thereto.

Additionally, Patent Document 2 discloses an inverter-integrated electric compressor in which an inverter housing section provided on the outer circumference of a housing has a high-voltage system component, such as a smoothing capacitor, and a coil, a metal power system circuit board, and a control system circuit board integrally formed therein via a resin case, an inverter module filled with gel material is assembled in the inverter housing section and is electrically connected via a busbar.

Furthermore, Patent Document 3 discloses an inverter-integrated electric compressor in which an inverter module having a metal power system circuit board and control system circuit board integrated therein is assembled into an inverter housing section of a housing, high-voltage system component and the like are sub-assembled using another housing case, and the subassembly is assembled into the housing and electrically connected via a busbar.

CITATION LIST

Patent Literatures

Patent Document 1: Japanese Unexamined Patent Application Publication No. 2003-322082A
Patent Document 2: Japanese Unexamined Patent Application Publication No. 2010-209685A
Patent Document 3: Japanese Unexamined Patent Application Publication No. 2009-275606A

SUMMARY OF INVENTION

Technical Problem

However, the inverter-integrated electric compressors described in the above Patent Documents 1 to 3 are configured so that a plurality of high-voltage system components, a power system circuit board, a control system circuit board, and a busbar; a plurality of high-voltage system components which constitute a part of a busbar assembly and the like, a power system circuit board, and a control system circuit board; or a busbar assembly which also serves as an external frame, a control system circuit board, and the like, which constitute an inverter device, are integrated or modularized so as to be incorporated into a housing. Therefore, there are problems in that a complex welding operation or soldering operation to interconnect the terminals of various electrical components needs to be performed on an assembly line for electric compressors, which leads to a rise in manufacturing costs, a reduction in productivity, and the like due to an increase in the number of assembly processes and the complexity thereof.

Additionally, gel material is charged in order to ensure the vibration resistance of a control system circuit board, and a metallic power system circuit board is used, resin encapsulation is employed, or the like in order to ensure the coolability and vibration resistance of heat-generating components, such as power elements, which leads to increases in costs, weight, and the like. Furthermore, extra assembly space needs to be ensured for individually assembling the constituent components and electrical components of the inverter device, which leads to an increase in the sizes of the inverter device itself and the inverter housing section, and, in turn, to an increase in the size of the inverter-integrated electric compressor.

In light of these circumstances, an object of the present invention is to provide an inverter-integrated electric compressor which allows for an improvement in assemblability of an inverter device with respect to a housing, an improvement in productivity and reduction in manufacturing costs, and allows for making the inverter device, and, in turn, the electric compressor itself more compact and lightweight.

Solution to Problem

In order to solve the above problems, the inverter-integrated electric compressor according to the present invention adopts the following means.

Namely, the inverter-integrated electric compressor of an embodiment of the present invention having an inverter device integrally incorporated into an inverter housing section that is disposed on the outer circumference of a housing, includes: the inverter device. The inverter device has a resin structure having a housing section for a high-voltage system component and a circuit board assembly section integrally formed therein; a high-voltage component housed and installed in the housing section of the resin structure, which includes a capacitor and coil; a power system circuit board assembled on the lower surface of the assembly section of the resin structure, which has a power element mounted thereon; a control system circuit board assembled on the upper surface of the assembly section of the resin structure, which has a control system circuit mounted thereon; and a busbar disposed between the power system circuit board and the control system circuit board, which is used for electrical wiring in the inverter device. Such an inverter device is unitized by the high-voltage system component, the power system circuit board, the control system circuit board, and the busbar being assembled into the resin structure, and the unit is incorporated into and integrated with the inverter housing section.

According to the present invention, since a high-voltage component, power system circuit board, control system circuit board, and busbar that constitute an inverter device are assembled into a resin structure that has a housing section for the high-voltage component and a circuit board assembly section integrally formed therein, and the inverter device is configured so as to be incorporated, in a unitized form, into the inverter housing section via the resin structure, all the constituent parts of the inverter device from the input terminal to the output terminal is sub-assembled in advance so as to be a unit, and the unit is assembled, on the assembly line for electric compressor, into the inverter housing section provided in a housing, so that the inverter-integrated electric compressor can be assembled. Consequently, a welding operation, a soldering operation, or the like to interconnect the plurality of electrical components that constitute the inverter device can be eliminated on the assembly line for electric compressor, whereby simplification of assembly, and a reduction in the number of processes and a reduction in manufacturing costs thereby can be facilitated, and productivity can be improved. Additionally, disposing the busbar and the like between two upper and lower circuit boards to unitize all the constituent parts of the inverter device allows the inverter device to be made more compact, which in turn makes it possible for the inverter-integrated electric compressor to be made more compact and lightweight.

In the above inverter-integrated electric compressor, the power system circuit board is a resin circuit board provided with a heat through part made from heat conductive material, corresponding to the mounting portion of the power element, and the heat through part is configured so as to come into contact with the wall surface of the housing that forms the bottom surface of the inverter housing section when the unit is assembled into the inverter housing section.

According to the present invention, since the power system circuit board is a resin circuit board provided with the heat through part made from heat conductive material, corresponding to the mounting portion of the power element, and the heat through part is configured so as to come into contact with the wall surface of the housing that forms the bottom surface of the inverter housing section when the unit is assembled into the inverter housing section, heat generated by the power element that is a heat-generating component is dissipated to the wall surface of the housing that forms the bottom surface of the inverter housing section via the heat through part made from heat conductive material, such as copper, and provided on the resin power system circuit board, thereby allowing the power element to be cooled using the wall surface as a heat sink. Consequently, even when the power system circuit board is a resin circuit board, sufficient cooling performance can be ensured with respect to the power element, allowing for reduced costs and lighter weight.

In all the inverter-integrated electric compressors described above, the busbar is disposed in an empty space between the power system circuit board and the control system circuit board, which sandwich the assembly section of the resin structure from above and below.

According to the present invention, since the busbar is disposed in the empty space between the power system circuit board and the control system circuit board that sandwich the assembly section of the resin structure from above and below, the busbar, which is used for electrical wiring in the inverter device, is disposed using the empty space formed between the power system circuit board and the control system circuit board that sandwich the assembly section of the resin structure from above and below, whereby a plurality of electrical components in the inverter device can be electrically interconnected by the busbar. Consequently, there is no need to ensure extra space to dispose the busbar; therefore, it is possible to make the inverter device overall more compact, and, in turn, to make the inverter-integrated electric compressor smaller.

In the above inverter-integrated electric compressor, the assembly section of the resin structure has a support integrally formed therein, and the support supports an inner portion (non-perimeter portion) of the control system circuit board from below.

According to the present invention, since the assembly section of the resin structure has a support, which supports from below the inner portion (non-perimeter portion) of the control system circuit board, integrally formed therein, not only is the perimeter portion of the control system circuit board supported, but the inner portion (non-perimeter portion) thereof can also be supported by the support provided in the resin structure. Consequently, the vibration resistance of the control system circuit board can be improved, and the need of vibration-proof gel material and the like is eliminated, allowing the constitution to be made simpler, lighter weight, lower cost, and the like. The inner portion (non-perimeter portion) to be supported by the support includes, in addition to the center portion of the circuit board, a portion in which a large component is mounted, and the like.

In the above inverter-integrated electric compressor, the inverter device is installed so as to be freely attached and detached by securely fastening the unitizing resin structure inside the inverter housing section with screws.

According to the present invention, since the inverter device is installed so as to be freely attached and detached by fastening the unitizing resin structure inside the inverter housing section with screws, the inverter device, which has been unitized via the resin structure, can be securely installed by fastening the resin structure with screws inside the inverter housing section, and can be removed as a unit by removing the screws. Consequently, assembly, maintenance, and the like, of the inverter device can be simplified and facilitated.

Advantageous Effects of Invention

According to the present invention, an inverter-integrated electric compressor can be assembled by all the constituent parts of an inverter device from the input terminal to the output terminal being sub-assembled so as to be a unit and the unit being assembled into an inverter housing section provided in a housing on an assembly line for electric compressor. Therefore, a welding operation, a soldering operation, or the like to interconnect the plurality of electrical components that constitute the inverter device can be eliminated on the assembly line for electric compressor. Thus, simplification of assembly, and a reduction in the number of processes and a reduction in manufacturing costs thereby can be facilitated, and productivity can be improved. Furthermore, disposing a busbar and the like between two upper and lower circuit boards to unitize all the constituent parts of the inverter device allows the inverter device to be made more compact, which, in turn, makes it possible for the inverter-integrated electric compressor to be made more compact and lightweight.

DESCRIPTION OF EMBODIMENTS

An embodiment of the present invention will be described below with reference to FIGS. 1 to 6.

Figure 1:
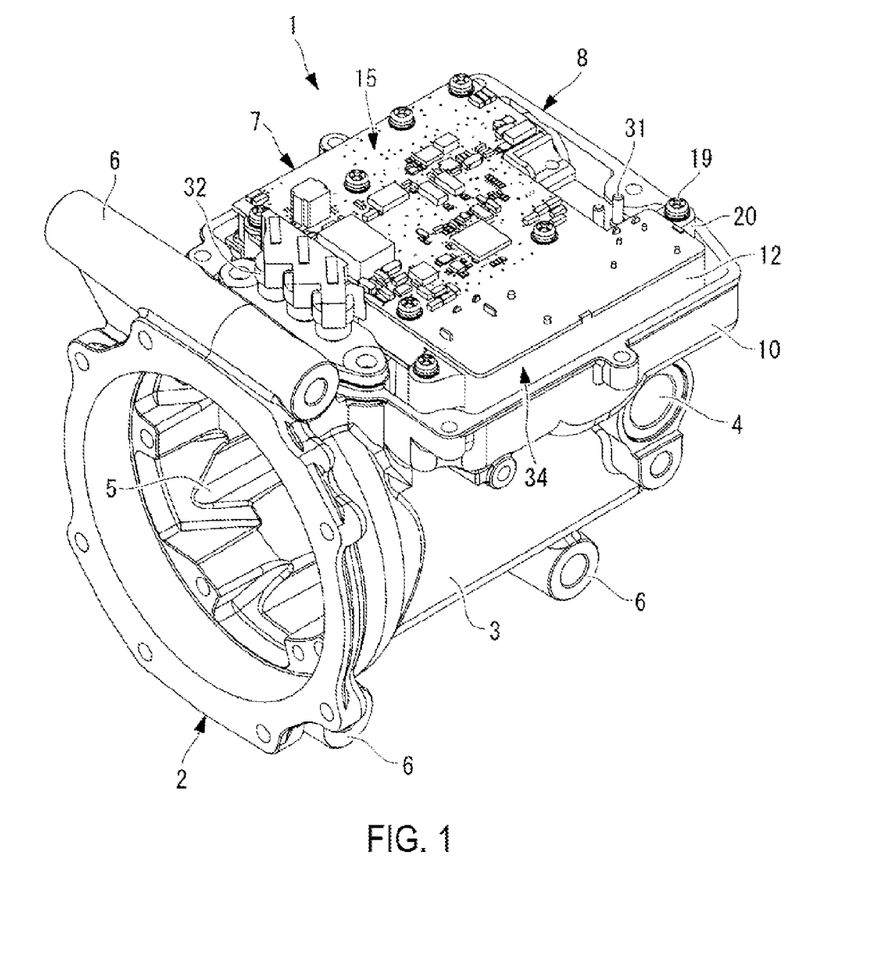
FIG. 1 is a perspective view of the main part of an inverter-integrated electric compressor according to an embodiment of the present invention.
Figure 2:
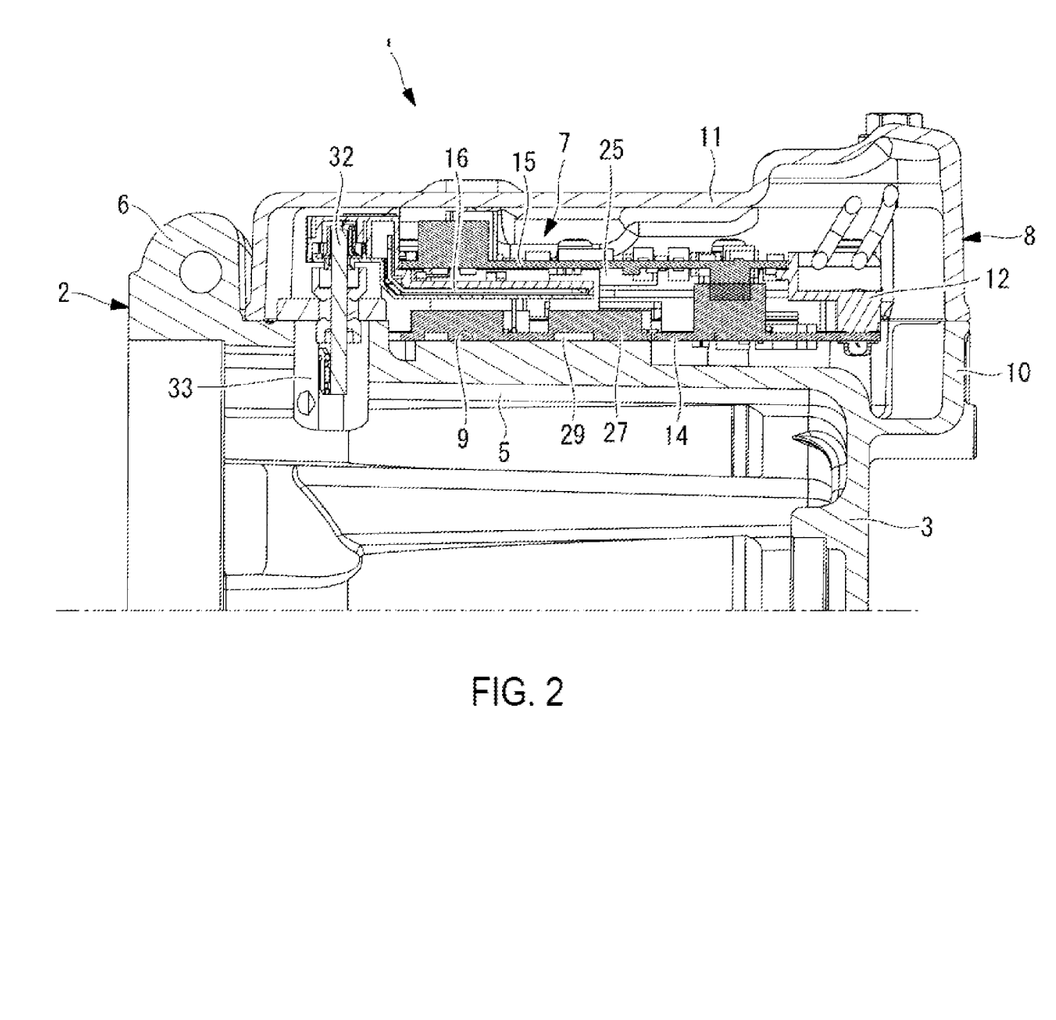
FIG. 2 is a longitudinal cross-sectional view along the axis of a motor housing of the inverter-integrated electric compressor illustrated in FIG. 1.
Figure 3:
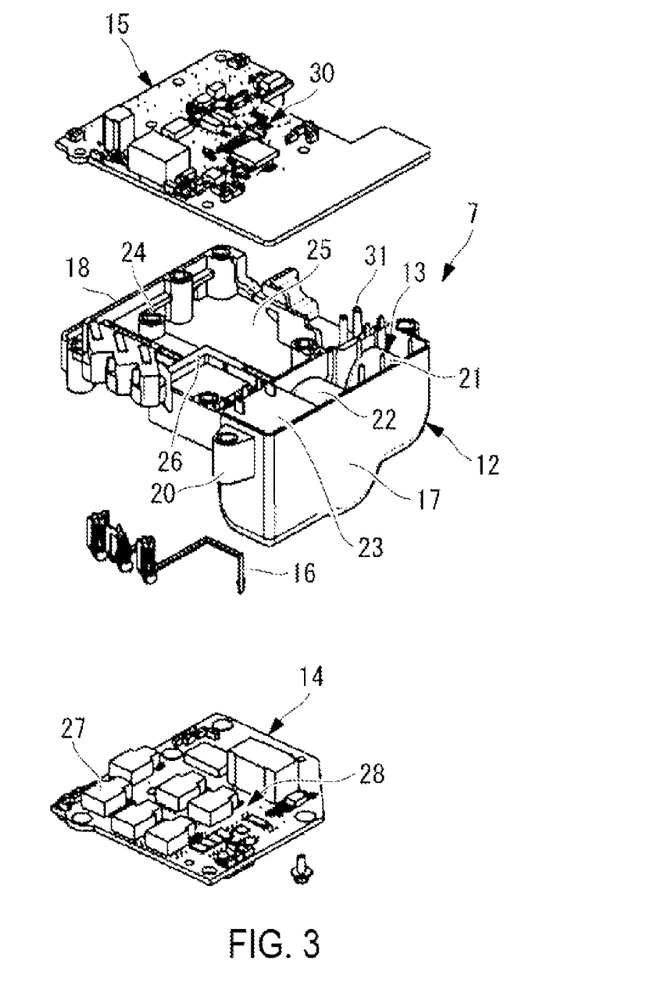
FIG. 3 is an exploded perspective view of an inverter device incorporated in the inverter-integrated electric compressor illustrated in FIG. 1.
Figure 4:
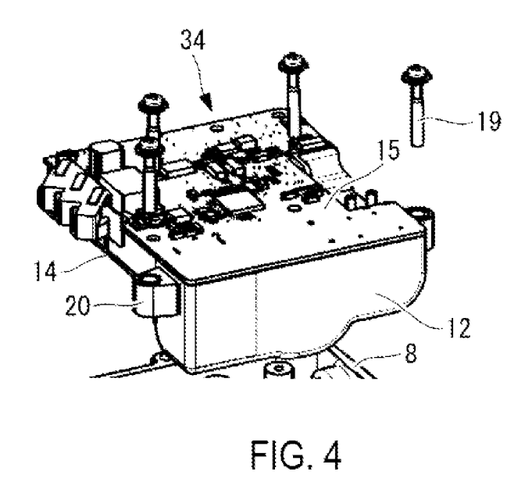
FIG. 4 is a perspective view of the inverter device illustrated in FIG. 3 in the assembled state.

FIG. 1 illustrates a perspective view of the main part of an inverter-integrated electric compressor according to an embodiment of the present invention. FIG. 2 illustrates a longitudinal cross-sectional view along the axis of a motor housing. FIG. 3 illustrates an exploded perspective view of an inverter device. FIG. 4 illustrates a perspective view of the inverter device in the assembled state.

The inverter-integrated electric compressor 1 is provided with a cylindrical housing 2 that constitutes an outer shell. The housing 2 is constituted by a motor housing 3, into which an electric motor (not illustrated) is built, and a compressor housing (not illustrated), into which a compression mechanism (not illustrated) is built, which are integrally joined.

The inverter-integrated electric compressor 1 is configured so that the electric motor and compression mechanism built into the housing 2 are linked through a rotary shaft, and the compression mechanism is driven by the electric motor being rotationally driven via an inverter device 7 described below, whereby a low-pressure refrigerant gas drawn into the interior of the motor housing 3 via an intake port 4 disposed in the side wall on the rear end side of the motor housing 3 is drawn in via the periphery of the electric motor, compressed to a high pressure by the compression mechanism, and discharged inside the compressor housing, and then sent outside.

The motor housing 3 has a plurality of refrigerant flow paths 5 formed therein to allow refrigerant to flow in the axial direction along the inner circumferential surface thereof, and a plurality of legs 6 for mounting an electric compressor 1 provided on the outer circumference thereof. An inverter housing section 8 is also integrally formed on the outer circumference of the housing 2 (on the motor housing 3 side) for integrally incorporating the inverter device 7. This inverter housing section 8 has a roughly square shape in the plan view, and is configured so that the bottom surface thereof is a partially and roughly flat seating face 9 formed by the wall surface of the motor housing 3, and a flange section 10 extends upward at the perimeter thereof.

The inverter housing section 8 is also configured so as to be hermetically sealed by mounting a cover 11 on the flange section 10, as illustrated in FIG. 2, after the inverter device 7 is incorporated. As publicly known, a high-voltage cable from a power supply unit installed in a vehicle is connected to this cover 11 via a connector (not illustrated), so that high-voltage direct current is applied to the inverter device 7 by connecting the connector to a P-N terminal 31 (see FIG. 1) disposed on the circuit board side of the inverter device 7.

As publicly known, the inverter device 7 converts high-voltage direct current power supplied via the high-voltage cable from the power supply unit installed in the vehicle into three-phase alternating current power of a specified frequency and then applies the three-phase alternating current power to the electric motor, which drives the electric motor. The inverter device 7 is constituted by a resin structure 12, a plurality of high-voltage system components 13 that are housed and installed in this resin structure, a power system circuit board 14 that is assembled on the lower surface of the resin structure 12, a control system circuit board 15 that is assembled on the upper surface of the resin structure 12, and a busbar 16 that is incorporated between the two upper and lower power system circuit board 14 and control system circuit board 15, as illustrated in FIG. 3.

The resin structure 12 is for unitizing the inverter device 7. The resin structure 12 is a structure in which a housing section 17 having a bottom and a volume required for housing and installing the plurality of high-voltage system components 13, and a frame-like assembly section 18 for assembling the power system circuit board 14 and the control system circuit board 15 are integrally resin-molded. The housing section 17 is formed on one side of the assembly section 18, i.e., corresponding to the surface on the outer circumference side of the motor housing 3 in which the intake port 4 is disposed. A plurality of legs 20 are integrally formed around the housing section 17 and assembly section 18 for securely fastening the unitized inverter device 7 with screws 19 (see FIG. 1) after the inverter device 7 is housed into the inverter housing section 8.

The housing section 17 is configured so as to house and install the plurality of high-voltage system components 13, such as a common mode coil (coil) 21, normal mode coil (coil) 22, and smoothing capacitor (capacitor) 23, which are connected to a high-voltage line and constitute a circuit to reduce, as publicly known, high-frequency noise and current ripples. This housing section 17 has a shape with a housing space corresponding to the external shape of the plurality of circular coils 21, 22 and a square capacitor 23, and is configured so as to secure and install the plurality of high-voltage system components 13 therein using adhesive or the like.

The assembly section 18 is integrally formed on one side of the housing section 17, and constitutes a frame-like assembly body with a height dimension to ensure the specified distance between the two upper and lower power system circuit board and control system circuit board. Multiple assembly bosses 24 are provided on the inner perimeter of this assembly section 18 to assemble the power system circuit board 14 and control system circuit board 15, with an empty space 25 in the center portion. Additionally, a support 26 for the control system circuit board 15 is integrally formed in the assembly section 18, extending in an L-shape toward the center portion of the empty space 25 from one corner of the assembly section 18.

Figure 5:
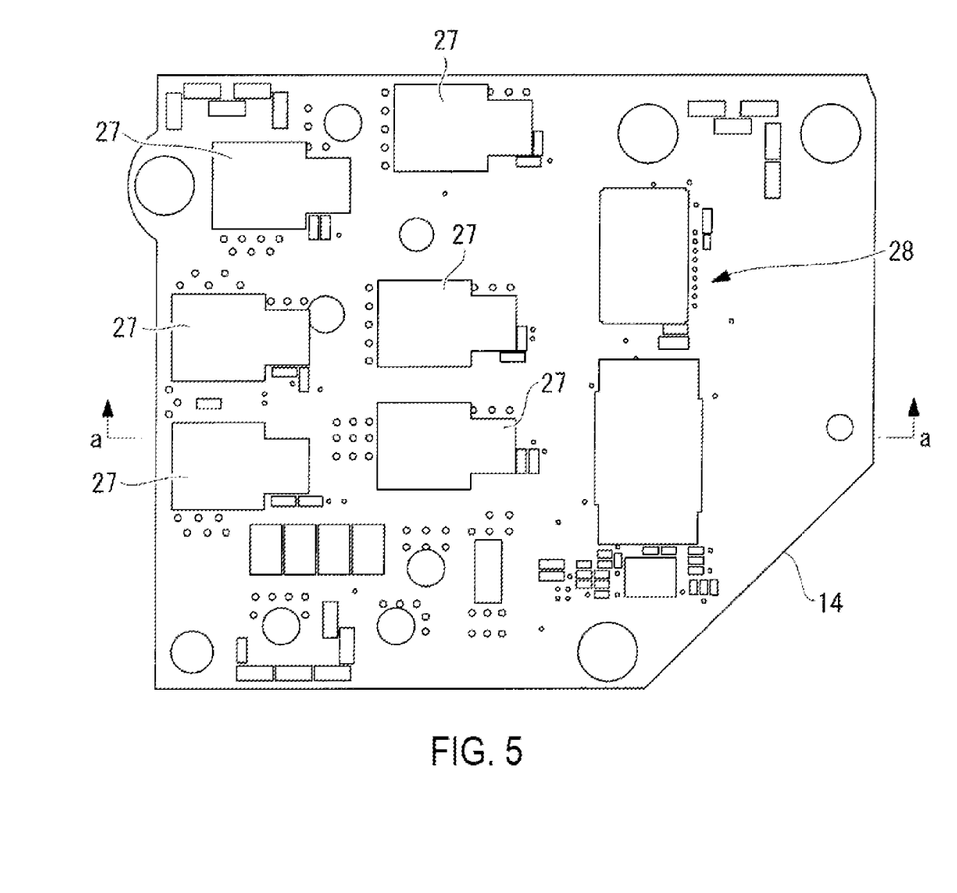
FIG. 5 is a plan view of a power system circuit board in the inverter device illustrated in FIG. 3.
Figure 6:
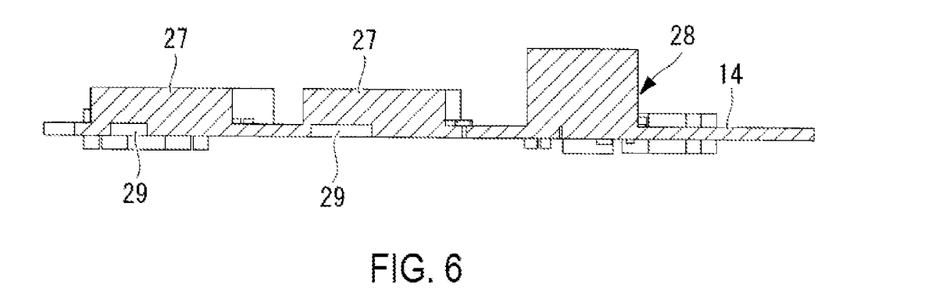
FIG. 6 is a longitudinal cross-sectional view along the line a-a in FIG. 5.

The power system circuit board 14 is a board on which a switching circuit 28 or the like, constituted by a plurality (6) of switching elements (power elements) such as IGBT that convert direct current power to three-phase alternating current power, is mounted. The power system circuit board 14 is assembled on the lower surface side of the assembly section 18 of the resin structure 12 by being securely fastened to the assembly bosses 24 with screws or the like. This power system circuit board 14 is a circuit board made from resin. As illustrated in FIGS. 5 and 6, the power system circuit board 14 is a so-called copper inlay circuit board that is able to conduct heat from the front side to the reverse side of a resin circuit board, in which a heat through part 29 made from heat conductive material, such as copper, is provided corresponding to the location where a power element 27, which is a heat-generating component, is mounted.

The heat through part 29 in the power system circuit board 14 is configured so that, when the unitized inverter device 7 is housed and installed into the inverter housing section 8, as illustrated in FIG. 2, the lower surface of the inverter device 7 comes into contact with the roughly flat seating face 9 of the motor housing 3 that forms the bottom surface of the inverter housing section 8, and heat generated by the power element 27 is dissipated via the heat through part 29 to the seating face 9 of the motor housing 3, thereby cooling the power element 27 with the seating face 9 as a heat sink. The seating face 9 of the motor housing 3 is able to function sufficiently as a heat sink, as described above, because the seating face 9 is cooled by low-pressure refrigerant gas that has been drawn in from the intake port 4 flowing through the refrigerant flow paths 5.

A control system circuit 30, which operates at a low voltage, such as a CPU, is mounted on the control system circuit board 15, which is to control operation of the inverter device 7 by a control signal from an ECU built into the vehicle. This control system circuit board 15 is assembled on the upper surface of the assembly section 18 of the resin structure 12 by being securely fastened to the assembly bosses 24 with screws or the like. The center portion of the control system circuit board 15 is supported from below via the support 26 that is integrally formed into the assembly section 18, thereby allowing for improved vibration resistance. The control system circuit board 15 may also be screwed to the support 26. The P-N terminal 31 described above extend upward from the control system circuit board 15.

The busbar 16 is used for electrical wiring between the electrical components in the inverter device 7. The busbar 16 is configured so as to be disposed using the empty space 25 between the power system circuit board 14 and control system circuit board 15, which sandwich the assembly section 18 of the resin structure 12 from above and below, as illustrated in FIG. 2. A UVW busbar 16, which outputs alternating current output of a specified frequency that has been converted by the inverter device 7 toward the electric motor, is illustrated as the busbar 16 here. This UVW busbar 16 is configured so as to be connected to a glass-sealed terminal 32 that is installed penetrating the motor housing 3, and to be connected to the electric motor via a cluster block 33 that is connected to this glass-sealed terminal 32.

Thus, the inverter device 7 is made into an inverter unit (unit) 34 integrated, as illustrated in FIG. 4, by sub-assembling the plurality of high-voltage system components 13, power system circuit board 14, control system circuit board 15, busbar 16, and the like that constitute the inverter device 7 into the resin structure 12 which is used as a base member. This unit 34 is then housed into the inverter housing section 8 provided on the motor housing 3, the legs 20 are securely fastened with the screws 19, and then the cover 11 is mounted for hermetic sealing. Accordingly, the inverter unit 34 is configured so as to be freely attached into and detached from the inverter housing section 8.

Thus, according to the present embodiment, the plurality of high-voltage system components 13, such as the plurality of coils 21, 22 and capacitor 23, the power system circuit board 14, the control system circuit board 15, and the busbar 16 that constitute the inverter device 7 are assembled onto the resin structure 12, in which the housing section 17 for the high-voltage system components 13 and the assembly section 18 for the two power system circuit board 14 and control system circuit board 15 are integrally formed, so as to be sub-assembled; then the subassembly in the form of the unit 34 integrated via the resin structure 12 is incorporated into the inverter housing section 8 provided in the housing 2 so as to be integrated with the electric compressor 1.

Therefore, all the constituent parts of the inverter device 7 from the input terminal to the output terminal is sub-assembled in advance so as to be the unit 34; then, the unit 34 is assembled, on an assembly line for the electric compressor 1, into the inverter housing section 8 provided in the housing 2, so that the inverter-integrated electric compressor 1 can be assembled. Consequently, a welding operation, a soldering operation, or the like to interconnect the plurality of electrical components that constitute the inverter device 7 can be eliminated on the assembly line for the electric compressor 1, whereby simplification of assembly, and a reduction in the number of processes and a reduction in manufacturing costs thereby can be facilitated, and productivity can be improved.

Additionally, disposing the busbar 16 and the like in the empty space 25 between the two upper and lower power system circuit board 14 and control system circuit board 15 to unitize all the constituent parts of the inverter device 7 into the unit 34 allows the inverter device 7 to be made more compact, which in turn makes it possible for the inverter-integrated electric compressor 1 to be made more compact and lightweight.

Furthermore, the power system circuit board 14 is a resin circuit board provided with the heat through part 29 made from heat conductive material, such as copper, the heat through part 29 being in correspondence to the mounting portion of the power element 27, wherein the heat through part 29 is configured so as to come into contact with the seating face 9 of the housing 2 (motor housing 3) that forms the bottom surface of the inverter housing section 8, when the inverter unit 34 is assembled into the inverter housing section 8.

Therefore, heat generated by the power element 27, which is a heat-generating component, is dissipated to the wall surface of the housing 2 that forms the bottom surface of the inverter housing section 8 via the heat through part 29 provided in the resin power system circuit board 14, allowing the power element 27, which is a heat-generating component, to be cooled using the wall surface (seating face 9) as a heat sink. Accordingly, even when the power system circuit board 14 is a resin circuit board, sufficient cooling performance can be ensured with respect to the power element 27, allowing for reduced costs and lighter weight.

Additionally, in the present embodiment, a busbar such as the UVW busbar 16 is disposed in the empty space 25 between the power system circuit board 14 and control system circuit board 15, which sandwich the assembly section 18 of the resin structure 12 from above and below. Therefore, the busbar 16, which is used for electrical wiring between the electrical components in the inverter device 7, is disposed using the empty space 25 formed between the power system circuit board 14 and control system circuit board 15, which sandwich the assembly section 18 of the resin structure 12 from above and below, whereby the various electrical components of the inverter device 7 can be electrically interconnected by the busbar 16. Consequently, there is no need to ensure extra space to disposed the busbar; therefore, it is possible to make the inverter device 7 overall more compact and, in turn, to make the inverter-integrated electric compressor 1 smaller.

Additionally, the support 26 is integrally provided in the assembly section 18 of the resin structure 12, which supports from below an inner portion (non-perimeter portion) of the control system circuit board 15, so that the inner portion of the control system circuit board 15 is supported from below by the support 26. Therefore, not only is the perimeter portion of the control system circuit board 15 supported, but the inner portion (nonperimeter portion) can also be supported by the support 26. Consequently, the vibration resistance of the control system circuit board 15 can be improved, and the need of vibration-proof gel material is eliminated, allowing the constitution to be made simpler, lighter weight, lower cost, and the like. The inner portion (non-perimeter portion) to be supported by the support 26 includes, in addition to the center portion of the control system circuit board 15, a portion in which a large component is mounted, and the like.

Furthermore, in the present embodiment, the inverter device 7 is installed so as to be freely attached and detached by fastening the unitizing resin structure 12 inside the inverter housing section 8 with the screws 19. The inverter device 7, which has been unitized via the resin structure 12, can be securely installed by fastening the resin structure 12 with screws 19 inside the inverter housing section 8, and can be removed as a unit 34 by removing the screws 19. Consequently, assembly, maintenance, and the like, of the inverter device 7 can be simplified and facilitated.

Note that the present invention is not limited to the invention according to the embodiment as described above, and changes can be made as appropriate without departing from the gist thereof. For example, the above embodiment has the configuration wherein the housing section 17, which houses the plurality of high-voltage system components 13 in the resin structure 12, is disposed facing the side surface on the intake port 4 side, but this configuration and disposition can be appropriately modified with a certain degree of freedom; e.g., a configuration wherein the housing section 17 is disposed facing the rear end surface of the motor housing 3.

Additionally, the above embodiment is configured having the high-voltage cable from a power source connected with the connector provided on the cover 11 side, from which high-voltage is input to the inverter device 7, but it may also be configured having high-voltage input from the side surface of the inverter housing section 8, or the like.

REFERENCE SIGNS LIST

1 Inverter-integrated electric compressor
2 Housing
3 Motor housing
7 Inverter device
8 Inverter housing section
9 Motor housing wall surface (seating face)
12 Resin structure
13 High-voltage system component
14 Power system circuit board
15 Control system circuit board
16 Busbar (UVW busbar)
17 Housing section
18 Assembly section
19 Screw
21 Common mode coil (coil)
22 Normal mode coil (coil)
23 Smoothing capacitor (capacitor)
25 Empty space
26 Support
27 Power element
29 Heat through part
30 Control system circuit
34 Inverter unit (unit)

The invention claimed is:

1. An inverter-integrated electric compressor having an inverter device incorporated into and integrated with an inverter housing section, the inverter housing section being provided on an outer circumference of a housing, the inverter-integrated electric compressor comprising:
   the inverter device including:
   a resin structure having a housing section for a high-voltage system component and a circuit board assembly section integrally formed therein;
   a high-voltage system component housed and installed in the housing section of the resin structure, the high-voltage system component including a capacitor and a coil;
   a power system circuit board assembled on a lower surface side of the circuit board assembly section of the resin structure, the power system circuit board having a power element mounted thereon;
   a control system circuit board assembled on an upper surface side of the circuit board assembly section of the resin structure, the control system circuit board having a control system circuit mounted thereon; and
   a busbar disposed between the power system circuit board and the control system circuit board, the busbar being used for electrical wiring in the inverter device;
   the inverter device being unitized by the high-voltage system component, the power system circuit board, the control system circuit board, and the busbar being assembled in the resin structure, and the unit being incorporated into and integrated with the inverter housing section.

2. The inverter-integrated electric compressor according to claim 1, wherein
   the power system circuit board is a resin circuit board in which a heat through part made from heat conductive material is provided corresponding to a mounting portion of the power element; and wherein
   upon the unit being assembled into the inverter housing section, the heat through part is configured so as to come into contact with a wall surface of the housing, the wall surface forming a bottom surface of the inverter housing section.

3. The inverter-integrated electric compressor according to claim 2, wherein the busbar is disposed in an empty space between the power system circuit board and the control system circuit board, the boards sandwiching the circuit board assembly section of the resin structure from above and below.

4. The inverter-integrated electric compressor according to claim 2, wherein the circuit board assembly section of the resin structure has a support integrally formed therein, the support supporting an inner portion (non-perimeter portion) of the control system circuit board from below.

5. The inverter-integrated electric compressor according to claim 2, wherein the inverter device is installed so as to be freely attached and detached by securely fastening the unitizing resin structure inside the inverter housing section using a screw.

6. The inverter-integrated electric compressor according to claim 1, wherein the busbar is disposed in an empty space between the power system circuit board and the control system circuit board, the boards sandwiching the circuit board assembly section of the resin structure from above and below.

7. The inverter-integrated electric compressor according to claim 6, wherein the circuit board assembly section of the resin structure has a support integrally formed therein, the support supporting an inner portion (non-perimeter portion) of the control system circuit board from below.

8. The inverter-integrated electric compressor according to claim 6, wherein the inverter device is installed so as to be freely attached and detached by securely fastening the unitizing resin structure inside the inverter housing section using a screw.

9. The inverter-integrated electric compressor according to claim 1, wherein the circuit board assembly section of the resin structure has a support integrally formed therein, the support supporting an inner portion (non-perimeter portion) of the control system circuit board from below.

10. The inverter-integrated electric compressor according to claim 9, wherein the inverter device is installed so as to be freely attached and detached by securely fastening the unitizing resin structure inside the inverter housing section using a screw.

11. The inverter-integrated electric compressor according to claim 1, wherein the inverter device is installed so as to be freely attached and detached by securely fastening the unitizing resin structure inside the inverter housing section using a screw.

* * * * *